G. M. HISKEY.
RAZOR.
APPLICATION FILED FEB. 28, 1911.

1,033,321.  Patented July 23, 1912.

Witnesses
W. A. Williams

Inventor
George M. Hiskey
By
Attorney

UNITED STATES PATENT OFFICE.

GEORGE M. HISKEY, OF LOS ANGELES, CALIFORNIA, ASSIGNOR OF ONE-FOURTH TO
J. B. RICE, OF BISBEE, ARIZONA.

RAZOR.

1,033,321.  Specification of Letters Patent.  Patented July 23, 1912.

Application filed February 28, 1911. Serial No. 611,366.

*To all whom it may concern:*

Be it known that I, GEORGE M. HISKEY, of Los Angeles, in the county of Los Angeles and State of California, have invented certain new and useful Improvements in Razors; and I do hereby declare the following to be a full, clear, and exact description of the invention, such as will enable others skilled in the art to which it appertains to make and use the same.

The primary object of this invention is to provide an improved, simple and highly efficient revoluble razor capable of being operated by any suitable power; and a further object is to provide for automatically removing the lather so as to avoid interfering with the free cutting of the blades.

The invention will be hereinafter fully set forth and particularly pointed out in the claims.

Figure 1:
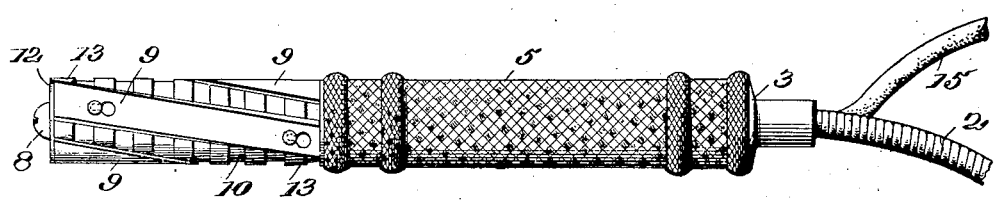
Figure 2:
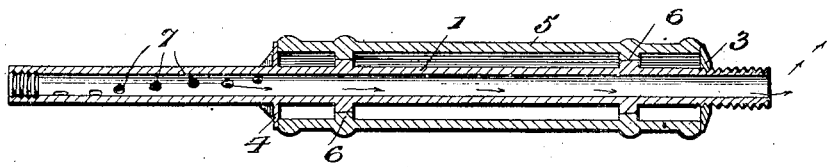
Figure 3:
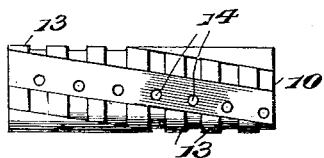
Figure 4:
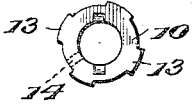
Figure 5:
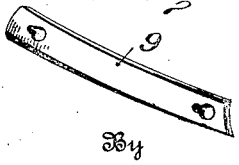

In the accompanying drawings, Figure 1 is a view in side elevation. Fig. 2 is a vertical longitudinal sectional view, with parts omitted. Fig. 3 is a view of the blade support with the blades removed. Fig. 4 is an end view of the blade support. Fig. 5 is a view of one of the blades.

Referring to the drawings, 1 designates a revoluble shaft to which rotation may be imparted by any suitable means and from any suitable motor, a flexible shaft, such as shown at 2, Fig. 1, being connected to the outer end of shaft 1. The latter at the end to which the flexible shaft is connected has an external screw thread to accommodate a nut 3 between which and the shoulder formed by an external flange 4 is located a tubular handle 5, the latter being preferably provided with inner flanges 6 for coöperating with corresponding flanges of shaft 1 to insure perfect bearing for the handle and centrally positioning the shaft. That portion of shaft 1 projecting beyond flange 4 has a series of spirally-arranged openings 7, and the extreme outer end of this shaft is longitudinally threaded to receive a screw 8.

9 designates a series of blades, each of which is of approximately spiral formation, that is to say, for instance, it would make one complete turn in about ten inches of its length. Each blade is, as shown in Fig. 5, of concavo-convex formation, and is detachably secured by any suitable means in a spiral-like position on a tubular support 10 which is detachably secured on the extended end of shaft 1 by screw 8 and disk 12. Each blade is shown as having two openings, each of the latter being enlarged at one end, as at 12$^a$, to accommodate headed lugs or screws 12$^b$ projecting from support 10. When a blade is positioned, with the lugs projecting through the enlarged ends of the openings, it is then moved longitudinally to position the heads of the lugs over the reduced portions of the openings, and the several blades are held in position by means common to all of them, namely the disk 12 and screw 8. The blade support has a series of spiral-like seats for the blades, four of which are preferably employed. These blades will, in practice, lie perfectly flat against the skin, and by reason of the spiral positioning will cut constantly, since one blade comes into action as another ceases to cut. In other words, the blades are constantly cutting, and by being spirally arranged they cut at the proper angle, and regardless of how the carrier is presented to the face, the blades will cut from one end to the other. The outer ends of the blades are about flush with disk 12, enabling the operator to shave at the corners of the mouth and the edges of the hair. Between the several blades are located circumferentially arranged ribs 13, and in the seat beneath the edge of each of the blades I provide a series of openings 14 which are designed to coincide with openings 7 of the shaft. The purpose of the coincident openings 7 and 14 is to allow lather to be automatically removed through shaft 1, by the creation of a partial vacuum, a hose 15 being conventionally shown in Fig. 1 as connecting shaft 1 with a suitable vacuum pump, not illustrated.

In practice, after the blades have been properly secured to their support and the latter has been attached to the projecting end of shaft 1, such shaft may be revolved, the operator holding the instrument by means of the hollow handle 5. The spiral arrangement of the blades insures the proper and continuous engagement with the skin of the person being shaved, and the circumferential ribs give to the blades all the advantages of a safety razor. As the blade support is revolving the lather is removed by the creation of a vacuum within the hollow shaft, and thus all danger of clogging the blades is avoided.

I claim as my invention:—

1. A razor comprising a revoluble hollow shaft, a handle therefor, said shaft having a series of openings therein, a blade support secured to said shaft and having a series of openings for coinciding with the openings in the shaft, and a blade detachably secured to said support, suction being designed to be created within said shaft.

2. A razor comprising a hollow shaft having one or more openings therein, a blade support mounted on said shaft and having one or more openings communicating with the opening or openings in the shaft, blades detachably secured to such support, suction being designed to be created within said shaft, and means for removably securing the blade support and the blades on said shaft.

3. A razor comprising a hollow shaft having one or more openings therein, a blade support mounted on said shaft and having one or more openings communicating with the opening or openings in the shaft, said blade support having a series of spirally arranged seats extending longitudinally thereof, a series of spirally arranged blades extending longitudinally of said support and secured on said seats, the edges of such blades presenting continuous cutting surfaces throughout the length of the blade support, and means for removably securing the blade support and the blades on said shaft.

4. The combination with a hollow revoluble shaft, having a series of perforations, and a relatively fixed hollow handle mounted on such shaft, of a blade support detachably secured to such shaft and having a series of perforations coinciding with the perforations of said shaft, a series of spirally-arranged blades having openings, lugs extending from said support and fitting in said openings for holding said blades to the support, means carried by said shaft for holding the support and blades, and spaced apart circumferential ribs between said blades, suction being designed to be created within said shaft.

In testimony whereof, I have signed this specification in the presence of two subscribing witnesses.

GEORGE M. HISKEY.

Witnesses:
H. E. Shepard,
F. M. Steele.